T. J. CAHILL.
AIRPLANE LANDING PLATFORM.
APPLICATION FILED JAN. 25, 1919.
1,326,020. Patented Dec. 23, 1919.
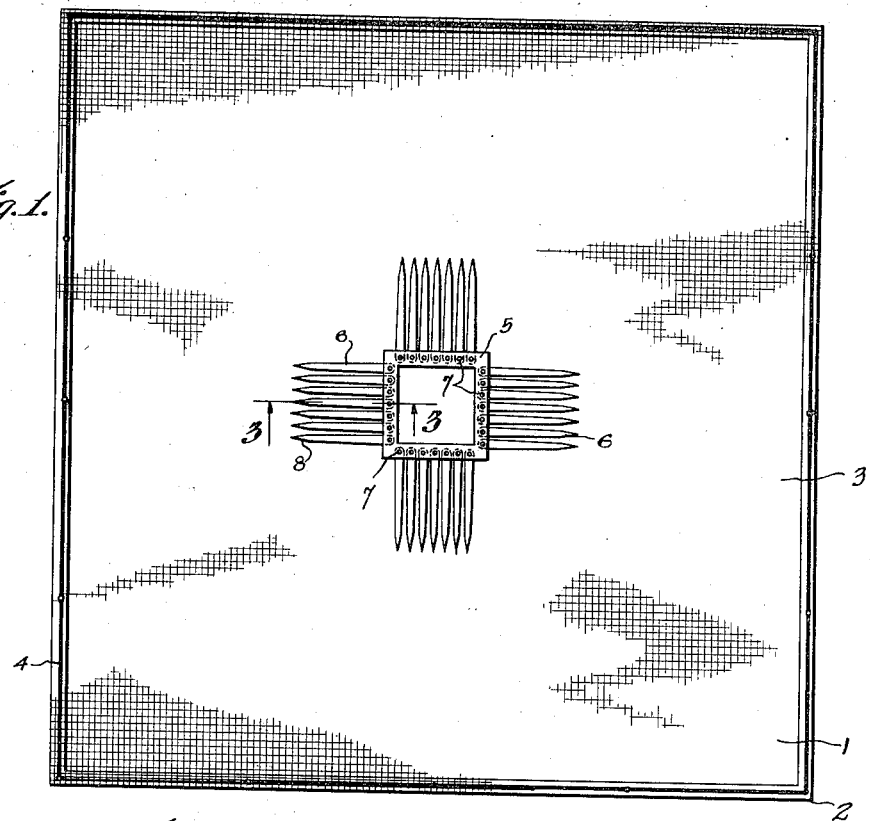
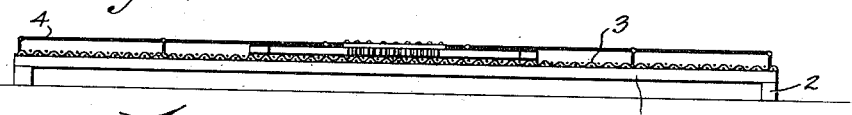
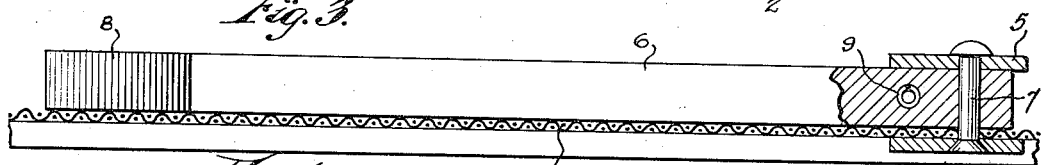
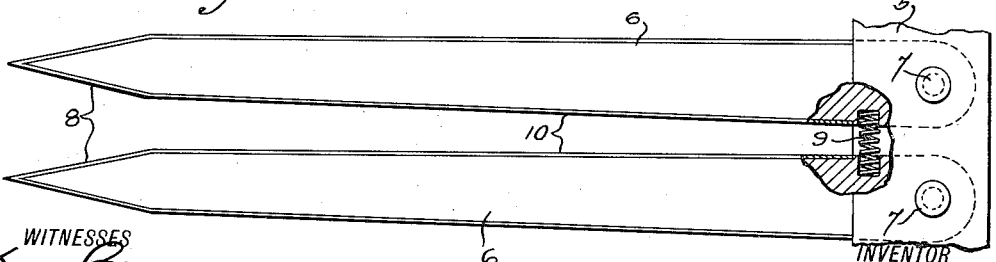
WITNESSES
Frank J. Faggiani
A. L. Kitchin.
INVENTOR
Thomas J. Cahill,
BY
ATTORNEYS

UNITED STATES PATENT OFFICE.

THOMAS J. CAHILL, OF PHILADELPHIA, PENNSYLVANIA.

AIRPLANE LANDING-PLATFORM.

1,326,020. Specification of Letters Patent. Patented Dec. 23, 1919.

Application filed January 25, 1919. Serial No. 273,067.

*To all whom it may concern:*

Be it known that I, THOMAS J. CAHILL, a citizen of Australia, and a resident of Philadelphia, in the county of Philadelphia and State of Pennsylvania, have invented a new and Improved Airplane Landing-Platform, of which the following is a full, clear, and exact description.

This invention relates to landing apparatus for airplanes, and has for an object the provision of an improved construction which will not only present a landing surface, but means for checking the progress of the airplane during the landing operation.

Another object of the invention is to provide a landing platform with friction means positioned to engage the runners or other parts of the airplane and thereby check the flight as the airplane approaches the center of the platform.

A further object more generally is the arrangement of the platform and airplane checking device which may be positioned in crowded sections of cities so as to provide a proper landing at any point desired and thus obviate the necessity of maintaining expensive aviation fields at points remote from the business sections of large cities.

In the accompanying drawing:

Figure 1 is a top plan view of a landing platform disclosing an embodiment of the invention.

Fig. 2 is an edge view of the structure shown in Fig. 1.

Fig. 3 is an enlarged fragmentary sectional view through Fig. 1 on line 3—3.

Fig. 4 is a top plan view of the structure shown in Fig. 3.

Referring to the accompanying drawing by numerals, 1 indicates the platform in its entirety which is made of considerable size and could be arranged to cover part of a block or if desired two or three blocks of a city. The platform is adapted to be supported in any suitable manner, such as a steel structure built on the roofs of buildings, the platform being reached by stairways, elevators, or other suitable devices, not forming any part of the present invention. In regard to the supporting of the platform it may be supported partially by the buildings and partially by separate supporting structures without departing from the spirit of the invention.

The platform is made up of a suitable number of framing members 2 to which the supporting wire 3 is secured, said wire being, of course, sufficiently strong to support easily one, or as many airplanes as may be placed on the platform, together with other necessary articles, aviators and attendants. The supporting frame work 2 is preferably comparatively open so that the wire mesh 3 will act somewhat in a resilient manner for resiliently supporting an airplane or other body placed on the platform. The platform may be of any shape, but preferably rectangular as shown in the drawing and preferably provided with guard rails 4 of any suitable construction, said guard rails being preferably comparatively low so as not to interfere with the airplane when landing.

Various forms of retaining devices may be arranged centrally of the platform, that shown consisting of a rectangular frame 5 secured to the supporting members 2 in any desired manner. Pivotally connected with the frame 5 are a plurality of friction members or arms 6 which are connected to the frame by pivotal pins 7. The frictional members 6 preferably taper from their pivotal point to the outer end, said outer ends being beveled or chamfered for producing points 8. Mounted between the tapering friction members 6 adjacent their pivotal points are coiled springs 9, the opposite ends thereof being countersunk into adjacent members 6. It will be understood, of course, that each of the members 6 is provided with an aperture on each side for receiving the respective springs 9 so that when the skid of an airplane or any part thereof strikes between any of the members 6 a spreading action thereof will result, said spreading action comprising the various springs 9, which by their resistance will check the progress of the airplane; this resistance will of course, increase as the airplane approaches the frame 5. After the airplane has made a landing and it is then moved away from the friction devices 6, said friction devices will automatically assume their former position as shown in Fig. 1 and by reason of the action of the springs 9 they will maintain the equal spacing of these members. Preferably the side edges are covered with a friction producing surface 10 which may be of any suitable material as for instance rubber or leather and may be secured in any desired manner, as for instance by tacks, adhesive or the like.

When landing the airplane is directed toward the center of the platform 1 in such a manner that its skids or runners will pass between the pivotally mounted friction members 6. Owing to the tapering formation of the space between said members a gradually increasing friction will be produced owing to the engagement of the friction surface 10 on the side faces of the skids or runners of the airplane and the action of the springs 9; so that the machine will be brought to a position of rest near the center of the platform without injury to the platform or airplane.

The landing platform and associate parts are capable of use by any form of airplane, but preferably the runners or skids of the airplane to be used on this platform are made approximately the same width as the space between members 6 near the outer ends so that the skids may freely enter said space and will immediately begin to produce a friction between the various parts and thereby reduce and eventually stop the movement of the airplane. It is, of course, understood that the friction devices 6 may be of any length as for instance two or three hundred feet long.

What I claim is:

1. A landing device for airplanes comprising a yieldable landing surface upon which the machine is free to travel, pivotally mounted friction arms associated therewith for retarding the motion of the machine during the movement thereof over said surface and springs for resiliently holding said arms in predetermined positions.

2. A landing device for airplanes comprising a platform, a plurality of friction producing elements arranged in spaced relation on said platform and in superimposed relation therewith, and resilient means for maintaining said friction elements in spaced relation.

3. A landing device for airplanes comprising a yielding landing surface arranged in the landing path of a machine, a plurality of resiliently mounted friction producing elements super-imposed with relation to said platform and arranged in equi-distant spaced relation, and means for maintaining said friction producing elements in spaced relation.

4. A landing device for airplanes comprising an elevated platform, pivoted friction producing elements arranged in spaced relation with respect to each other and superimposed relation with the platform, and coiled springs engaging adjacent faces of the friction producing elements adjacent their pivoted ends for maintaining the spaced relation thereof.

5. A landing device for airplanes comprising a platform, and means arranged centrally of the platform for checking and eventually stopping the progress of an airplane landing on the platform, said means comprising a plurality of pivotally mounted friction elements, each of said elements having a yielding covering acting as friction means, and a spring arranged between adjacent elements for resiliently resisting any pivotal movement thereof.

6. A landing device for airplanes comprising a frame, substantially radially extending arms or friction elements projecting from the frame, means pivotally connecting one end of each of said arms to said frame, and a spring arranged between adjacent arms for resiliently holding the arms in a given position.

THOMAS J. CAHILL.